3,106,497
SPHERICAL PARTICLE OXIDIZER OF LITHIUM PERCHLORATE AND AMMONIUM PERCHLORATE AND PROPELLANT
Lester L. Weil, Menlo Park, Calif., assignor to United Aircraft Corporation, a corporation of Delaware
No Drawing. Filed Jan. 3, 1961, Ser. No. 80,035
5 Claims. (Cl. 149—17)

This invention relates to an oxidizer for use in a solid propellant rocket engine. The oxidizers heretofore used in solid propellant rocket engines have consisted of one or more chemical materials, usually selected from the perchlorates or inorganic nitrates. These chemicals are crystalline materials which do not melt so that it has been impossible to provide uniform, spherical oxidizer particles. As a result, the solid oxidizer materials are used either in their crystalline form or the crystals are ground and thus consist of particles of various sizes, all of which are irregularly shaped, having sharp edges. The oxidizers have been used in this manner despite the fact that it is recognized that it would be highly advantageous if spherical particles of pure oxidizer were available. Spherical particles avoid the stress problems associated with irregular particles and also increase the fluidity of propellant formulations. Further, if spherical particles are used, it is possible to select the sizes of the particles to more easily control the degree or oxidizer density. Such oxidizers are incorporated in a matrix of a fuel element which is ordinarily an organic resin or plastic such as a natural or synthetic rubber and it is, of course, highly desirable that a uniform dispersion be produced.

It has now been found that certain mixtures of lithium perchlorate and ammonium perchlorate form mixtures which melt and which can be formed into particles while molten of any desired size and shape, thus producing for the first time a solid spherical particle consisting 100 percent of oxidizing material. Preferably the mixture contains about 70 mole percent of lithium perchlorate and 30 mole percent ammonium perchlorate which forms a mixture melting at about 200° C. However, meltable mixtures are formed with from 60 to 80 mole percent lithium perchlorate and 20 to 40 mole percent ammonium perchlorate and in many instances, it is desirable to depart from the 70:30 ratio to secure special properties such as control of burning rate, control of combustion chamber pressure and the like.

Various techniques can be used to form the particles in the desired size and shape. One of the simplest and most practical is to melt the mixture and pass it through a screen in a shot tower whereby droplets are formed which cool and solidify as they fall. By selecting the size of the holes and the pressure in the shot tower, particles having almost any desired size can be produced. Another method is to use a mold and to cast the particles in the desired size and shape. After the spherical particles are formed, they can be classified in known manner to give a desired size distribution or to obtain particles of a uniform size. Particles can then be mixed with a fuel, such as rubber, and handled as a normal castable propellant.

The following non-limiting example illustrates a preferred method of practicing the present invention.

*Example 1*

Seventy mole percent of lithium perchlorate and 30 mole percent of ammonium perchlorate were mixed together. The well-mixed powder was then placed in an indirectly-fired heating vessel and heated to a temperature of 200° C. The mixture was divided into two portions one of which was passed through a shot tower to produce spheres having an average particle size of 500 microns and the other passed through a tower yielding 50 micron particles. An oxidizer mixture was then made containing 70 weight percent of 500 micron particles and 30 weight percent of 50 micron particles. Eighty weight percent of this oxidizer mixture was then mixed with 20 weight percent of polyurethane to form a castable propellant.

It is obvious that the spherical particles of the present invention represent a distinct advance in the art of making oxidizers and may be employed in any application wherein a solid oxidizer having uniform and predictable performance characteristics is required.

I claim:
1. Spherical particles suitable for use in a solid propellant consisting of between about 60 and 80 mole percent lithium perchlorate and between 20 and 40 mole percent ammonium perchlorate, said particles having been formed from a liquid melt.

2. Spherical particles suitable for use in a solid propellant consisting of about 70 mole percent of lithium perchlorate and about 30 mole percent of ammonium perchlorate, said particles having been formed from a liquid melt.

3. A solid propellant comprising a matrix of a normally solid fuel material with spherical particles of an oxidizer dispersed therein, said spherical particles consisting of between about 60 and 80 mole percent lithium perchlorate and between about 20 and 40 mole percent ammonium perchlorate, said particles having been formed from a liquid melt.

4. A process for forming an oxidizer in the form of spherical particles for use in a solid propellant comprising forming a mixture of between about 60 and 80 mole percent lithium perchlorate and between about 20 and 40 mole percent ammonium perchlorate, heating the mixture so formed to provide a liquid melt and then passing the said melt through a shot tower to produce the said spherical oxidizer material.

5. A process for forming an oxidizer in the form of spherical particles suitable for use in a solid propellant comprising forming a mixture of between about 60 and 80 mole percent lithium perchlorate and between about 20 and 40 mole percent ammonium perchlorate, heating the mixture so formed to provide a liquid melt and thereafter casting the said melt into the said spherical particles.

References Cited in the file of this patent

UNITED STATES PATENTS

| | | |
|---|---|---|
| 2,622,277 | Bonell et al. | Dec. 23, 1952 |
| 2,783,138 | Parsons | Feb. 26, 1957 |